(12) United States Patent
Hogan et al.

(10) Patent No.: US 8,802,755 B2
(45) Date of Patent: Aug. 12, 2014

(54) RUBBER COMPOSITIONS INCLUDING METAL PHOSPHATE ESTERS

(71) Applicant: Bridgestone Corporation, Tokyo (JP)

(72) Inventors: Terrence E. Hogan, Uniontown, OH (US); Xiaorong Wang, Hudson, OH (US); Victor J. Foltz, Akron, OH (US); Kentaro Kayashima, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/793,532

(22) Filed: Mar. 11, 2013

(65) Prior Publication Data

US 2013/0190423 A1 Jul. 25, 2013

Related U.S. Application Data

(63) Continuation-in-part of application No. 13/352,452, filed on Jan. 18, 2012, now abandoned.

(60) Provisional application No. 61/433,769, filed on Jan. 18, 2011.

(51) Int. Cl.
*C08K 5/521* (2006.01)

(52) U.S. Cl.
USPC .......................................... 524/127; 524/140

(58) Field of Classification Search
USPC ................................. 524/127, 140
See application file for complete search history.

(56) References Cited

U.S. PATENT DOCUMENTS

| | | |
|---|---|---|
| 2,447,064 A | 8/1948 | Gebhart et al. |
| 2,599,553 A | 6/1952 | Hotten |
| 2,768,996 A | 10/1956 | Bulloff |
| 3,018,291 A | 1/1962 | Anderson et al. |
| 3,024,237 A | 3/1962 | Drummon et al. |
| 3,172,892 A | 3/1965 | Le Suer et al. |
| 3,219,666 A | 11/1965 | Norman et al. |
| 3,223,495 A | 12/1965 | Calvino et al. |
| 3,272,746 A | 9/1966 | La Suer et al. |
| 3,361,673 A | 1/1968 | Stuart et al. |
| 3,367,864 A | 2/1968 | Elliott et al. |
| 3,443,918 A | 5/1969 | Kautsky et al. |
| 3,461,108 A | 8/1969 | Heilman et al. |
| 3,560,455 A | 2/1971 | Hazen et al. |
| 3,560,456 A | 2/1971 | Hazen et al. |
| 3,560,457 A | 2/1971 | Hazen et al. |
| 3,580,893 A | 5/1971 | Heilman et al. |
| 3,706,704 A | 12/1972 | Heilman et al. |
| 3,729,450 A | 4/1973 | Galiano et al. |
| 3,729,451 A | 4/1973 | Blecke et al. |
| 3,738,948 A | 6/1973 | Dunnom |
| 3,836,511 A | 9/1974 | O'Farrell et al. |
| 3,912,764 A | 10/1975 | Palmer et al. |
| 3,944,552 A | 3/1976 | Lawrence |
| 3,990,978 A | 11/1976 | Hill |
| 4,003,393 A | 1/1977 | Jaggard et al. |
| 4,007,128 A | 2/1977 | Poklacki |
| 4,016,931 A | 4/1977 | Cryar, Jr. |
| 4,031,014 A | 6/1977 | Griffin, Jr. |
| 4,038,207 A | 7/1977 | Poklacki et al. |
| 4,046,524 A | 9/1977 | van Hesden |
| 4,078,609 A | 3/1978 | Pavlich |
| 4,094,795 A | 6/1978 | DeMartino et al. |
| 4,104,173 A | 8/1978 | Gay et al. |
| 4,115,285 A | 9/1978 | van Hesden |
| 4,137,400 A | 1/1979 | DeMartino et al. |
| 4,143,007 A | 3/1979 | DeMartino |
| 4,143,715 A | 3/1979 | Pavlich |
| 4,152,289 A | 5/1979 | Griffin, Jr. |
| 4,152,499 A | 5/1979 | Boerzel et al. |
| 4,153,066 A | 5/1979 | Griffin, Jr. |
| 4,153,649 A | 5/1979 | Griffin, Jr. |

(Continued)

FOREIGN PATENT DOCUMENTS

| | | |
|---|---|---|
| EP | 0355895 B1 | 2/1990 |
| EP | 0542380 A1 | 5/1993 |

(Continued)

OTHER PUBLICATIONS

Notification of First Office Action, The State Intellectual Property Office of P.R. China, Application No. 200980132972.3, Aug. 28, 2012.

(Continued)

*Primary Examiner* — Peter Szekely

(74) *Attorney, Agent, or Firm* — Meredith E. Hooker; Nathan T. Lewis

(57) ABSTRACT

A composition includes a diene rubber and a metal phosphate ester of the formula:

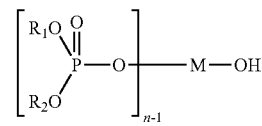

M being a metal with an oxidation state of +3 or +4, and $R_1$ and $R_2$ are independently selected from any organic moiety including hydrogen, except $R_1$ and $R_2$ cannot both be hydrogen. In addition, a method of making a rubber composition includes combining a solvent and a phosphate ester and mixing these to foam a solution. A source of metal ions is then added to the solution. The metal in the source of metal ions is selected from the group consisting of metals with an oxidation state of +3 or +4. The product is then is combined with a diene rubber composition to form a useful article, such as the tread of a tire.

26 Claims, No Drawings

(56) References Cited

U.S. PATENT DOCUMENTS

| | | | |
|---|---|---|---|
| 4,169,798 A | 10/1979 | DeMartino | |
| 4,169,818 A | 10/1979 | DeMartino | |
| 4,172,055 A | 10/1979 | DeMartino | |
| 4,174,283 A | 11/1979 | Griffin, Jr. | |
| 4,200,539 A | 4/1980 | Burnham et al. | |
| 4,200,540 A | 4/1980 | Burnham | |
| 4,234,435 A | 11/1980 | Meinhardt et al. | |
| 4,301,025 A | 11/1981 | Brady et al. | |
| 4,316,810 A | 2/1982 | Burnham | |
| 4,322,336 A | 3/1982 | Machurat et al. | |
| 4,410,437 A | 10/1983 | Erdman | |
| 4,446,281 A | 5/1984 | Takamatsu et al. | |
| 4,450,254 A | 5/1984 | Isley et al. | |
| 4,473,408 A | 9/1984 | Purinton, Jr. | |
| 4,507,213 A | 3/1985 | Daccord et al. | |
| 4,537,700 A | 8/1985 | Purinton, Jr. | |
| 4,595,513 A | 6/1986 | Morgenthaler et al. | |
| 4,622,155 A | 11/1986 | Harris et al. | |
| 4,781,845 A | 11/1988 | Syrinek et al. | |
| 4,787,994 A | 11/1988 | Thorne et al. | |
| 4,791,140 A | 12/1988 | Fukasawa et al. | |
| 4,795,574 A | 1/1989 | Syrinek et al. | |
| 4,860,821 A | 8/1989 | Hagewood | |
| 4,877,894 A | 10/1989 | Huddleston | |
| 4,880,444 A | 11/1989 | Savins et al. | |
| 4,910,267 A | 3/1990 | Oyama et al. | |
| 5,034,139 A | 7/1991 | Reid et al. | |
| 5,057,233 A | 10/1991 | Huddleston | |
| 5,110,485 A | 5/1992 | Huddleston | |
| 5,112,507 A | 5/1992 | Harrison | |
| 5,137,978 A | 8/1992 | Degonia et al. | |
| 5,137,980 A | 8/1992 | DeGonia et al. | |
| 5,150,754 A | 9/1992 | Phelps et al. | |
| 5,175,225 A | 12/1992 | Ruhe, Jr. | |
| 5,190,675 A | 3/1993 | Gross | |
| 5,202,035 A | 4/1993 | Huddleston | |
| 5,271,464 A | 12/1993 | McCabe | |
| 5,281,023 A | 1/1994 | Cedillo et al. | |
| 5,286,799 A | 2/1994 | Harrison et al. | |
| 5,319,030 A | 6/1994 | Harrison et al. | |
| 5,393,309 A | 2/1995 | Cherpeck | |
| 5,441,340 A | 8/1995 | Cedillo et al. | |
| 5,514,645 A | 5/1996 | McCabe et al. | |
| 5,523,417 A | 6/1996 | Blackborrow et al. | |
| 5,565,528 A | 10/1996 | Harrison et al. | |
| 5,590,958 A | 1/1997 | Dearing, Sr. et al. | |
| 5,616,668 A | 4/1997 | Harrison et al. | |
| 5,624,182 A | 4/1997 | Dearing, Sr. et al. | |
| 5,625,004 A | 4/1997 | Harrison et al. | |
| 5,777,025 A | 7/1998 | Spencer et al. | |
| 5,792,729 A | 8/1998 | Harrison et al. | |
| 5,854,327 A | 12/1998 | Davis et al. | |
| 5,916,961 A | 6/1999 | Hergenrother et al. | |
| 5,922,792 A | 7/1999 | Wideman et al. | |
| 5,972,852 A | 10/1999 | Robson | |
| 5,972,853 A | 10/1999 | Boffa et al. | |
| 5,981,662 A | 11/1999 | D'Sidocky et al. | |
| 5,990,053 A | 11/1999 | Jones et al. | |
| 6,004,908 A | 12/1999 | Graham et al. | |
| 6,054,417 A | 4/2000 | Graham et al. | |
| 6,133,354 A | 10/2000 | Wang et al. | |
| 6,174,989 B1 | 1/2001 | D'Sidocky et al. | |
| 6,204,354 B1 | 3/2001 | Wang et al. | |
| 6,207,763 B1 | 3/2001 | Wang et al. | |
| 6,261,998 B1 | 7/2001 | Amin et al. | |
| 6,271,409 B1 | 8/2001 | Geib | |
| 6,297,201 B1 | 10/2001 | Geib | |
| 6,302,209 B1 | 10/2001 | Thompson, Sr. et al. | |
| 6,342,468 B1 | 1/2002 | Geib | |
| 6,350,800 B1 | 2/2002 | Wang et al. | |
| 6,353,054 B1 | 3/2002 | Wang et al. | |
| 6,359,064 B1 | 3/2002 | Wang et al. | |
| 6,369,166 B1 | 4/2002 | Wang et al. | |
| 6,372,855 B1 | 4/2002 | Chino et al. | |
| 6,384,134 B1 | 5/2002 | Hall et al. | |
| 6,401,776 B1 | 6/2002 | Wang et al. | |
| 6,403,724 B1 | 6/2002 | Wang | |
| 6,417,259 B1 | 7/2002 | Wang et al. | |
| 6,458,881 B1 | 10/2002 | Pan et al. | |
| 6,602,828 B2 | 8/2003 | Armin et al. | |
| 6,632,781 B2 | 10/2003 | Harrison et al. | |
| 6,699,813 B2 | 3/2004 | Luo et al. | |
| 6,706,823 B2 | 3/2004 | Wang et al. | |
| 6,719,053 B2 | 4/2004 | Thompson | |
| 6,849,581 B1 | 2/2005 | Thompson et al. | |
| 7,314,850 B2 | 1/2008 | Taylor et al. | |
| 7,328,744 B2 | 2/2008 | Taylor et al. | |
| 7,429,393 B2 | 9/2008 | Wang et al. | |
| 7,521,400 B2 | 4/2009 | Samuel | |
| 7,534,745 B2 | 5/2009 | Taylor et al. | |
| 7,700,673 B2 | 4/2010 | Wang et al. | |
| 2002/0022085 A1 | 2/2002 | Thise et al. | |
| 2002/0188064 A1 | 12/2002 | Wang et al. | |
| 2003/0130397 A1 | 7/2003 | Wang et al. | |
| 2003/0130401 A1 | 7/2003 | Lin et al. | |
| 2005/0022915 A1 | 2/2005 | Bowen, III et al. | |
| 2006/0223945 A1 | 10/2006 | Hollingshurst et al. | |
| 2007/0015853 A1 | 1/2007 | Weng et al. | |
| 2008/0153972 A1 | 6/2008 | Wang et al. | |

FOREIGN PATENT DOCUMENTS

| | | |
|---|---|---|
| EP | 0570159 A1 | 11/1993 |
| EP | 0602863 B1 | 6/1994 |
| EP | 0864606 B1 | 9/1998 |
| EP | 1270657 B1 | 1/2003 |
| EP | 0535642 | 4/2005 |
| EP | 1803771 A1 | 7/2007 |
| GB | 695113 | 12/1949 |
| WO | 9008170 A1 | 7/1990 |
| WO | WO 9008170 | 7/1990 |
| WO | 02096677 A1 | 12/2002 |
| WO | WO 02096677 | 12/2002 |
| WO | 2004058874 | 7/2004 |
| WO | 2004058874 A1 | 7/2004 |
| WO | 2007070063 | 6/2007 |
| WO | 2009070063 A1 | 6/2009 |

OTHER PUBLICATIONS

Lowe, Chelsea M., Non-Final Rejection, United States Patent and Trademark Office, U.S. Appl. No. 13/000,696, Sep. 11, 2012.

Cai, Wenwen. Non-Final Office Action U.S. Appl. No. 12/347,404 Apr. 13, 2011.

Admasu, Atnaf S. Advisory Action dated Nov. 10, 2009 from U.S. Appl. No. 11/615,659 (8 pp.).

Admasu, Atnaf S. Final Office Action dated Aug. 18, 2009 from U.S. Appl. No. 11/615,659 (8 pp.).

Admasu, Atnaf S. Office Action dated Jan. 21, 2009 from U.S. Appl. No. 11/615,659 (10 pp.).

Bauer, Walter H. et al., "Entrance Effects in Capillary Flow of Aluminun Dilaurate-Toluene Gels", J. Phy. Chem., vol. 62, pp. 1245-1247 (Oct. 1958).

Bauer, Walter H. et al., "Flow Properties and Structure of Peptized Aluminum Soap-Hydrocarbon Gels", J. Phy. Chem., vol. 62, pp. 106-110 (Jan. 1958).

Cai, Wenwen. Final Office Action U.S. Appl. No. 12/347,404 Aug. 26, 2011.

Hayashi et al. Database WPI Week 199001, Thomas Scientific, Long, GB; AN 1990-004108 (1 pg.).

English Translation of Nov. 30, 2011 Office Action from Chinese Patent Application No. 200810191041.8 (6 pp.).

EP Office Action, Jan. 9, 2008, from European Application No. 06256456.2 (6 pp).

EP Office Action, Schmitt J. 08254195.2-2102 Dec. 28, 2009.

EP Office Action, Schmitt J. 08254195.2-2102 Aug. 26, 2010.

EP Search Report, Schmitt J. 08254195.2-2102 Jun. 2, 2009.

Funkhouser, Gary P. et al. "Rheological Comparison of Organogelators Based on Iron and Aluminum Complexes of Dodecylmethylphosphinic Acid and Methyl Dodecanephosphonic Acid", Langmuir, vol. 25, Issue 15, pp. 8672-8677 (2009).

(56) References Cited

OTHER PUBLICATIONS

Gaskins, Frederick H. et al. "Rheology of Aluminum Dilaurate in Toluene", Transactions of Society of Rheology, vol. 13, No. pp. 17-38 (1969).
Harple, Warren W. et al. "Infared Absorption Spectra of Aluminum Soaps", Analytical Chemistry, vol. 24, No. 4, pp. 635-638 (Apr. 1952).
Kim, Gye Sook. International Search Report from PCT/US2009/048834, 4 pp. (Feb. 2, 2010).
Ludke, Willard O. et al. "Mechanism of Peptization of Aluminum Soap—Hydrocarbon Gels Based Upon Infared Studies", J. Phy. Chem. vol. 59, pp. 222-225 (Mar. 1955).
Mcgee, Charles G. "Aluminum Momolaurate and Proposed Structures for Aluminum Soaps", Am. Chem. Soc. vol. 71, pp. 278-282 (Jan. 1949).
Mettler, Rolf-Martin. Apr. 10, 2007 extended European search report from European Patent Application No. 06256456.2 (6 pp.).
Mohajer, Y. et al. "New Polyisobutylene-Based Model Elastomeric Ionomers. VI. The Effect of Excess Neutralizing Agents on Solid-State Mechanical Properties", Applied Polymer Science, vol. 29, No. 6, pp. 1943-1984).
Mysels, Karol J. "Studies of Aluminum Soaps: IX. Electron Microscope View of Lyophilized Aluminum Laurate", The Journal of General Physiology, pp. 159-161 (Jul. 15, 1946).
Nora, Angelo et al. "Metallic Soaps", internet article, XP-002524032, pp. 1-16 (Sep. 15, 2001).
Ow, Say Kyoun. "Investigation of the Role of Sulfate Ions in the Reaction Between Tetrahydroabietic Acid Monolayers and Aluminum Ions", The Institute of Paper Chemistry, Doctor's Dissertation, pp. 1-156 (Jun. 1974).
Scott, Angela C. Final Office Action dated Jun. 9, 2008 from U.S. Appl. No. 11/646,981 (6 pp.).
Scott, Angela C. Final Office Action dated Sep. 2, 2010 from U.S. Appl. No. 11/646,981 (7 pp.).
Scott, Angela C. Office Action dated Nov. 24, 2008 from U.S. Appl. No. 11/646,981 (5 pp.).
Scott, Angela C. Office Action dated Nov. 28, 2007 from U.S. Appl. No. 11/646,981 (7 pp.).
Scott, Angela C. Office Action dated Mar. 26, 2010 from U.S. Appl. No. 11/646,981 (6 pp.).
Scott, Angela C. Office Action dated Jul. 7, 2009 from U.S. Appl. No. 11/646,891 (6 pp.).
Scott, Angela C. Final Office Action dated Jan. 8, 2010 from U.S. Appl. No. 11/646,981 (6 pp.).
Sun, Yuejian. English translation of Oct. 8, 2010 First Office Action from Chinese Patent Application No. 200610170337.2 (10 pp.).
Trappe, V. et al. "Scaling to of the Viscoelasticity of Weakly Attractive Particles", Physical Review Letters, vol. 85, No. 2, pp. 449-452 (Jul. 10, 2000).
Wang, Xiaorong et al. "Gelling nature of aluminum soaps in oils", Journal of Colloid and Interface Science, 331, pp. 335-342 (Nov. 13, 2008).
Weber, Neill et al. "Flow Properties of Aluminum Dilaurate-Toluene Gels", J. Phys. Chem., vol. 60, pp. 270-273 (Mar. 1956).
Weill, J. et al. "Reaction du Polyisobutene Chlore Sur L'Anhydride Maleique: Mecanisme; Catalyse Par L'Anhydride Dichloromalcique", Revue de L'Institut Francais due Petrole, vol. 40, No. 1, pp. 77-89 (Jan.-Feb. 1985).

RUBBER COMPOSITIONS INCLUDING METAL PHOSPHATE ESTERS

CROSS-REFERENCE TO RELATED APPLICATIONS

This application is a continuation-in-part of application Ser. No. 13/352,452, filed on Jan. 18, 2012, which in turn claimed the benefit of priority from U.S. Provisional Application No. 61/433,769, filed on Jan. 18, 2011. These prior applications are hereby incorporated into the present application by reference.

FIELD

The technology discussed herein relates generally to additives for rubber compositions.

BACKGROUND

In the tire industry, rubber compositions are engineered to have a balance of properties; for example, durability (i.e. tensile strength and tear resistance), rolling resistance, and traction. Typically, modifying a composition to improve one or more of these qualities makes it difficult to maintain at least one other quality. While improvement in traction and durability are highly desirable, maintaining low rolling resistance is also highly important, particularly with the increasing prices of fuel and other concerns in recent years.

SUMMARY

In one aspect of the technology disclosed herein, a composition includes a diene rubber and a metal phosphate ester of the following formula:

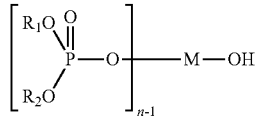

wherein M is a metal with an oxidation state of +3 or +4, $R_1$ and $R_2$ are independently selected from any organic moiety including hydrogen, except $R_1$ and $R_2$ cannot both be hydrogen, and n represents the oxidation state of M. In one embodiment, M may be iron, titanium, aluminum, or cobalt.

In another aspect of the technology disclosed herein, a tire component comprises the composition described above.

In another aspect of the technology disclosed herein, a method of making a rubber composition includes the preparation of a metal phosphate ester by the following method. Combining a solvent, a base, and a phosphate source, and mixing these to form a Solution A. A source of metal ions in solution is added to Solution A and mixed to form Product A, the metal ions being selected from the group consisting of metals with an oxidation state of +3 or +4. Product A is isolated from solution, and then is combined with a diene rubber composition. In an embodiment, M may be iron, titanium, aluminum, or cobalt.

In another aspect of the technology disclosed herein, a composition includes a diene rubber, and a metal phosphate ester of the following formula:

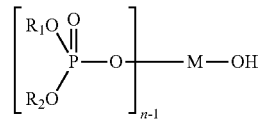

wherein M is a Group III (IUPAC Group 13) or transition metal excluding zinc, copper, and nickel, $R_1$ and $R_2$ are independently selected from any organic moiety including hydrogen, except $R_1$ and $R_2$ cannot both be hydrogen, and n is the valence of M. In another example, M may be iron, titanium, or aluminum.

In another aspect of the technology disclosed herein the compositions and processes described above contain metal phosphate esters wherein R comprises an alkyl chain with one or more double bonds.

As used herein, it should be understood that the term "a" means "one or more." It should also be understood that the use of more than one solvent, base, phosphate source, transition metal, etc. may be used in accordance with the invention, unless otherwise stated. By di-phosphate is meant a species with two phosphate atoms. Correspondingly, mono- and tri-phosphates are species with one and three phosphate atoms. The compositions disclosed herein and the compositions made by the methods disclosed herein may be incorporated into a tire tread, sidewall, or other tire portion.

DETAILED DESCRIPTION

Unexpectedly, it was discovered that by adding certain metal phosphate esters to diene rubber compositions, significant improvement in the tensile strength and wet traction properties of the rubber composition could be obtained. In addition, a comparable level of rolling resistance was maintained.

Certain metal phosphate esters, such as aluminum and iron di-phosphate esters, have been found to display qualities that are believed to contribute to their unexpected property-enhancing effects in rubber compositions. For example, these metal phosphate esters include certain phosphate esters of metals that have oxidation states of +3 or +4, like scandium (Sc), yttrium (Y), lanthanum (La), actinium (Ac), chromium (Cr), iron (Fe), cobalt (Co), ruthenium (Ru), iridium (Ir), gallium (Ga), indium (In), titanium (Ti), manganese (Mn), germanium (Ge), tin (Sn), aluminum (Al) and lead (Pb). Particular examples of metal phosphate esters described above, are those that are not soluble in polar solvents and do not dissociate into ions in polar solvents, such as water. Metal phosphate esters that are soluble in polar solvents include alkali metals and most alkaline earth metals, including, lithium (Li), sodium (Na), potassium (K), rubidium (Rb), cesium (Cs), and francium (Fr); beryllium (Be), magnesium (Mg), calcium (Ca), strontium (Sr), barium (Ba) and radium (Ra), and some transition metals, such as zinc (Zn), mercury (Hg), and cadmium (Cd). In some embodiments of the composition described herein, metal phosphate esters may include metals of the Group III (IUPAC Group 13) and transition metals, excluding zinc (Zn), nickel (Ni), and copper (Cu). The solubility of the metal phosphate ester is affected by the length of the phosphate ester chains.

A general formula for the metal phosphate ester is depicted in Formula I.

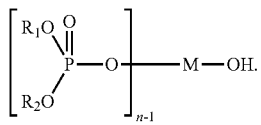

M is a metal with a +3 or +4 oxidation state, and $R_1$ and $R_2$ are independently selected from any organic moiety including hydrogen, except $R_1$ and $R_2$ cannot both be hydrogen. The letter "n" corresponds to the valence of the metal. The term organic moiety, is meant to describe any chemical group primarily comprised of carbon, oxygen, nitrogen, or hydrogen, including organic groups that may contain heteroatoms.

In some embodiments M is a Group III (IUPAC Group 13) metal or transition metal, excluding zinc, copper, and nickel.

In an embodiment, M, $R_1$ and $R_2$ of Formula I may be any combination of metals, and organic moieties, respectively, that form a species that displays shear thinning characteristics when mixed in toluene.

Particular examples of species that are believed to display shear thinning characteristics when mixed in toluene are aluminum and iron phosphate esters wherein $R_1$ and $R_2$ are $C_6$ to $C_{22}$. Other metals that may display this characteristic are metals with a +3 or +4 oxidation state.

Particular examples of $R_1$ and $R_2$ groups include hydrogen (except $R_1$ and $R_2$ cannot both be hydrogen), straight or branched hydrocarbon chains, including straight or branched hydrocarbons that include various organic or inorganic functional groups. The $R_1$ and $R_2$ groups may, for example, may be a $C_2$ to $C_5$ alkyl groups, a $C_6$ to $C_{22}$ alkyl group, or $C_{23}$ to $C_{50}$ alkyl group. A specific example R group is $C_{12}H_{25}$. The metal phosphate ester may, for example, be bis(dilaurylphosphato)iron(III)hydroxide or bis(dilaurylphosphato)aluminum(III)hydroxide.

The number of phosphate ester groups bonded to M are represented by the term "n−1," and may be, for example, 2 or 3, depending on the oxidation state of the metal element used. For example, when M is aluminum (III), n−1 would be 2, or when M is titanium, n−1 could be 2 or 3 depending on its oxidation state.

Metal phosphate esters that include a double bond in one or both R groups may be particularly effective when combined with a rubber matrix and vulcanized. Without being bound by theory, the double bond may contribute to improved cross-linking with diene rubber matrices. In this embodiment $R_1$ and/or $R_2$ contain at least one unit of unsaturation. For example, the $R_1$ and/or $R_2$ group may be a monounsaturated $C_2$ to $C_5$ alkyl chain, a monounsaturated $C_6$ to $C_{22}$ alkyl chain, or higher monounsaturated alkyl chains such as $C_{23}$ to $C_{50}$. The $R_1$ and/or $R_2$ group may also contain multiple double bonds such as two or three double bonds in the alkyl chain. The double bond may be a sulfur-curable double bond. In embodiments that include multiple double bonds, the double bonds may be conjugated. At least one double bond or all double bonds may be between two non-terminal carbons in the alkyl chain. For example, the double bond may be at or near the middle of the alkyl chain.

In an embodiment, the metal phosphate esters are not soluble in water and are soluble in diene rubber compositions. In an embodiment, the metal phosphate ester is a phosphate ester of aluminum or iron and an alcohol derivative.

The diene rubbers may, for example, be sulfur-curable rubbers, such as one or more of conjugated dienes, such as styrene-butadiene rubber, butadiene rubber, isoprene rubber, poly(styrene-isoprene) rubber, styrene-isoprene-butadiene terpolymer, or natural rubber. The diene rubber may, for example, comprise any conventionally employed treadstock rubber. Such rubbers are well known to those skilled in the art and include, but are not limited to, natural rubber, synthetic polyisoprene rubber, styrene-butadiene rubber (SBR), styrene-isoprene rubber, styrene-isoprene-butadiene rubber, butadiene-isoprene rubber, polybutadiene (BR), acrylonitrile-butadiene rubber (NBR), silicone rubber, fluoroelastomers, ethylene acrylic rubber, ethylene propylene rubber (EPR), ethylene propylene diene monomer (EPDM) rubber, butyl rubber, polychloroprene, hydrogenated nitrile rubber, and mixtures thereof.

The metal phosphate ester may be present in the rubber composition in amounts of about 1 to about 100 phr, such as about 5 to about 75 phr, about 7 to about 20, about 5 to about 30 phr, or about 15 to about 50 phr, for example.

The rubber composition may include other additives known to those of skill in the art. An illustrative diene rubber composition that includes a metal phosphate ester additive also includes (a) an optional process oil and (b) one or more components selected from the group consisting of carbon black, silica, vulcanizing agent, vulcanization accelerator, tackifier resin, antioxidant, fatty acids, wax, peptizer, vulcanization retarder, activator, processing additive, plasticizer, pigments, and antiozonant.

A generalized example method of making the metal phosphate ester is shown in Formulas Ia, Ib, and II.

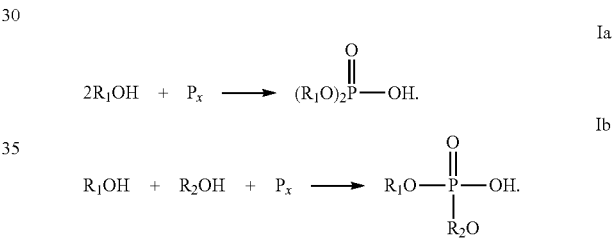

An alcohol ($R_1$OH) (Ia) or optionally a mixture of alcohols also including $R_2$OH (Ib) are mixed with a phosphate source $P_x$. $P_x$ includes $P_2O_5$, and $P_4O_{10}$, and may also include phosphoryl and thiophosphoryl halides and pseudohalides, such as $POF_3$, $POCl_3$, $POBr_3$, $POI_3$, $PO(NCO)_3$, $PO(NCS)_3$, $PSF_3$, $PSCl_3$, $PSBr_3$, $PSI_3$, $PS(NCO)_3$, $PS(NCS)_3$, $POF_2Cl$, $POFCl_2$, $POF_2Br$, $POFBr_2$, $POCl_2Br$, $POClBr_2$, $PSF_2Cl$, $PSFCl_2$, $PSF_2Br$, $PSFBr_2$, $PO(NCO)FCl$, $PS(NCS)F_2$. If a halogenated phosphate source is employed, then $H_2O$ may also be added to produce the phosphate ester product of Formula I. $R_1$ and $R_2$ are as described above. Additional alcohols could also be added to the mixture if desired to provide phosphate esters with a mixture of different R groups.

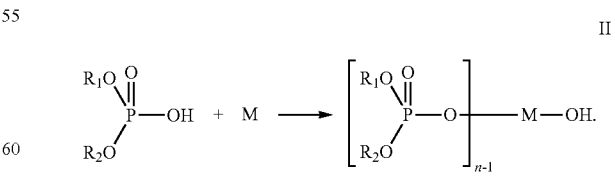

In formula II, the phosphate ester product of formula Ia or Ib is added to a solvent, such as a polar solvent, for example, water, THF, acetone, acetonitrile, DMF, DMSO, acetic acid, n-butanol, isopropanol, n-propanol, ethanol, or methanol. Sodium hydroxide or another base, such as potassium hydroxide, potassium carbonate, calcium carbonate, and ammonia, may be added to facilitate dissolution and adjust the pH of the solution. A metal ion source is also added.

The metal ion source may, for example, correspond to the formula:

with M being a metal as described above; and where Z is selected from the group consisting of potassium sulfate, hydroxide, sulfate, and phosphate, and 1 and m are independently integers from 1 to about 20, such as about 4 to about 16, or about 2 to about 5. For example, aluminum potassium sulfate is known to be an inexpensive and effective source of aluminum metal ions. The metal, for example, has an oxidation state of +3 or +4, or in other embodiments may be a Group III (IUPAC Group 13) or transition metal excluding zinc, nickel, and copper. In some embodiments, the metal may be selected from the group consisting of aluminum, iron, titanium, and cobalt. The pH of the solution prior to adding the source of metal ions may be adjusted by addition of the base so that the solution is basic.

In an embodiment, the metal phosphate ester is then isolated from solution for addition to a diene rubber composition.

In one embodiment the source of metal ions may be prepared separately in solution and then added to the solution containing the phosphate ester. This solution may be formed by adding the metal ion source to a polar solvent such as water.

Stirring and heating may be used to induce the metal ions to associate with the phosphate ester species, thereby creating the metal phosphate ester as a product. In an embodiment, the metal phosphate ester is insoluble in polar solvent. The product includes the metal phosphate ester, and may include other reaction residues such as potassium sulfate and/or water.

It should be noted that the metal phosphate ester may be synthesized in a manner to promote a high percentage of molecules to form into di-phosphate esters (i.e. where "n–1" equals 2) rather than the mono- and tri-phosphate esters. In some embodiments, such as when M is aluminum, maximizing the formation of the di-phosphate ester is desired. For the other metal phosphate esters, a single hydroxyl group pending from the metal ion may be preferred for some embodiments with the remaining valences filled with phosphate organic moieties.

Molecules of aluminum di-phosphate ester can be encouraged to form by slowly adding the solution containing the metal ion source to the solution containing the phosphate ester, as opposed to quickly combining the two solutions. Varying the temperature and concentration of Solution A and B are other ways to affect the formation of mono-, di-, or tri-phosphate esters. The number of phosphate moieties on the metal atom can also be controlled by varying the relative amounts of metal ion and phosphate ester molecules. For example, a source of metal ions and a source of phosphate ester molecules may be present in a molar ratio of about 1:10 to about 1:1 metal ions to phosphate ester molecules, such as about 1:6 to about 1:1.1, or about 1:2.5 to about 1:1.5.

In a further step of the exemplary method, Product A is isolated from the solvent. For example, bis(dilaurylphosphato)iron(III)hydroxide and bis(dilaurylphosphato)aluminum (III)hydroxide can be isolated by washing the reaction product with water and drying it, thereby resulting in a powdery product.

In a further step to the exemplary method, the metal phosphate ester is combined with a diene rubber composition. Any of the diene rubbers previously mentioned may be selected. Again, stirring and heating may be used to encourage dissolving the metal phosphate ester solution in the rubber composition.

The rubber and the metal phosphate ester may be compounded by methods generally known in the rubber compounding art, such as mixing the rubbery matrix polymer and the metal phosphate ester with conventional amounts of various commonly used additive materials, using standard rubber mixing equipment and procedures. Common additives include, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the rubber composition, the additives mentioned above are selected and commonly used in conventional amounts, in addition to other conventional rubber additives including, for example, other fillers, plasticizers, antioxidants, cure agents and the like, using standard rubber mixing equipment and procedures. For example, the diene rubber composition may be prepared by emulsion, solution, or bulk polymerization according to known suitable methods. Generally, mixing of components is accomplished in an internal mixer such as a Brabender or small size Banbury mixer, and because of the shear forces involved, the formulation process generally is exothermic and high temperatures are normal.

In one embodiment, a rubber composition is prepared by the steps of (a) mixing together at a temperature of about 110° C. to about 200° C. (drop temperature) in the absence of added sulfur and cure agents, an elastomer, the metal phosphate ester, a reinforcing filler comprising silica or a mixture thereof with carbon black, and a filler coupling agent, (b) allowing the mixture to cool below the mixing temperature; (c) mixing the mixture obtained in step (b) at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes. The drop temperature for mixing together the components also can be about 145° C. to about 190° C., such as about 155° C. to about 180° C.

The initial mixing step can optionally include at least two substeps: (i) mixing together at a temperature of about 110° C. to about 180° C., the elastomer, and at least a portion of the filler, (ii) cooling the mixture below the mixing temperature; and (iii) mixing the mixture obtained in step (ii) with the remainder of the filler, if any. The temperatures achieved by the at least two substeps can be the same or different from each other, within the temperature range of about 110° C. to about 180° C.

The method can further include a remill step in which either no ingredients are added to the first mixture, or only non-curing, non-polymeric, and non-filler ingredients are added. The remill stage may reduce the compound viscosity and improve the dispersion of the reinforcing filler. The metal phosphate ester may be added in the remill step, so as not to interfere with any filler/coupling agent reaction. The drop temperature of the remill step is typically about 130° C. to about 175° C., such as about 145° C. to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C.

and is typically about 40° C. to about 120° C., suitably about 60° C. to about 110° C., or about 75° C. to about 100° C.

An illustrative rubber composition comprising the metal phosphate esters described above also includes (a) a rubber matrix, (b) an optional oil, and (c) one or more components selected from the group consisting of carbon black, silica, filler coupling agent, vulcanizing agent, vulcanization accelerator, tackifier resin, antioxidant, fatty acids, wax, peptizer, vulcanization retarder, activator, processing additive, plasticizer, pigments, and antiozonant.

Examples of the vulcanizing agent include sulfur and sulfur donating compounds. The amount of the vulcanizing agent used in the rubber composition may be from 0.1 to 10 parts by weight, or from 1 to 5 parts by weight per 100 parts by weight of the rubber component. Specific examples include 1.5, 1.7, 1.87, and 2.0, and ranges including these endpoints.

The vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio)benzothiazole (MBS). Example amounts of accelerators include 0.25, 0.5, 1.0, 1.5, 1.65, and 2.0 phr, and ranges including these endpoints. More than one accelerator may also be used.

Oil may be used as a compounding aid in rubber compositions. Examples of oil include, but are not limited to, aromatic, naphthenic, and/or paraffinic processing oils. In some applications, it may be preferable to use low-polycyclic-aromatic (PCA) oils, particularly oils that have a PCA content of less than 3%. A typical amount of oil in a composition may broadly range from about 0 phr to about 100 phr, from about 2 phr to about 70 phr, or from about 10 phr to about 50 phr, such as about 15 phr, about 20 phr, or about 30 phr, and ranges including these endpoints, based on 100 phr rubbery matrix in the rubber composition. In an exemplary embodiment, the metal phosphate ester is used to replace a portion of the oil, or is used to replace the entirety of the oil in a rubber compound. For example, about 1% to about 100%, about 5% to about 50%, or about 10% to about 40% of the oil may be replaced by the metal phosphate ester.

The filler may be selected from the group consisting of carbon black, silica, and mixtures thereof. The total amount of filler may be from about 1 to about 100 phr, from about 30 to about 80 phr, from about 40 to about 70 phr, or from about 50 to about 100 phr of filler.

Suitable carbon blacks include any of the commonly available, commercially-produced carbon blacks. Specific examples include carbon blacks having a surface area of at least 20 m$^2$/g, or at least 35 m$^2$/g up to 200 m$^2$/g or higher. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, and N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or in an amount of about 5 to 80 phr, or in an amount of about 30 to about 80 phr. The useful upper range is limited by the high viscosity imparted by fillers of this type. Some of the commercially available silicas that can be used include, but are not limited to, HiSil® 190, HiSil® 210, HiSil® 215, HiSil® 233, and HiSil® 243, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

If silica is used as a filler, it may be desirable to use a coupling agent to couple the silica to the polymer. Numerous coupling agents are known, including but not limited to organosulfide polysulfides. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyetrisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxysilylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of various organosilane polysulfide compounds can be used.

The amount of coupling agent in the composition is based on the weight of the silica in the composition. The amount of coupling agent present in the composition may be from about 0.1% to about 20% by weight of silica, or from about 1% to about 15% by weight of silica, or from about 1% to about 10% by weight of silica. For example, typical amounts of coupling agents include 4, 6, 8, and 10 phr.

Certain additional fillers may also be utilized, including mineral fillers, such as clay, talc, aluminum hydrate, aluminum hydroxide and mica. The foregoing additional fillers are optional and can be utilized in the amount of about 0.5 phr to about 40 phr.

Antioxidants may also be used in amounts including 0.5, 1, 1.5, 2.0, and 2.5 phr, and ranges including these amounts as endpoints. More than one type of antioxidant may be used in conjunction.

A vulcanized rubber product may be produced from the rubber composition that includes the metal phosphate ester described above and other additives by shaping and curing the compound. The illustrative rubber compositions described herein can be used for tire treadstock, sidewall stock, or other tire component stock compounds. Such products can be built, shaped, molded and cured by various methods that are known and will be readily apparent to those having skill in the art. In an embodiment, a molded, unvulcanized tire is charged into a vulcanizing mold and then vulcanized to produce a tire.

The following examples are included to provide additional guidance to those skilled in the art in practicing the claimed invention. The examples provided are merely representative of the work that contributes to this disclosure. Accordingly, these examples are not intended to limit the invention, as defined in the appended claims, in any manner.

EXAMPLES

Example 1

A 3-neck, 2000 mL, round bottom flask was equipped with a mechanical stirrer, a reflux condenser, a thermometer, a nitrogen purging line, an oil bath, and a temperature heating/cooling plate. Into this flask, 141.8 g of phosphorus pentoxide (from Aldrich, about 98+% purity, ACS reagent, MW=141.94) and 380 g 1-dodecanol (from Aldrich, ~98+% purity, ACS reagent, MW=186.34) at 23° C. were added. Under stirring and nitrogen purging, the mixture was slightly heated to 60° C. to melt 1-dodecanol. After the reaction began, the mixture was cooled down to below 90° C. because the reaction was exothermic. After about 4 hours, the reactants were heated to 140° C. for 14 hours, and then the reaction temperature was set to 160° C. for 7 hours under refluxing to finish etherification. After that, the product was cooled down to 90° C., and poured out of the flask and collected. At 23° C., the product looked like wax.

The product of Example 1 was believed to correspond to Formula Ia, where $R_1$ is a $-C_{12}H_{25}$ group, and $P_x$ is $P_2O_5$.

Example 2

To a 0.5 gallon-size glass bottle was added 1000 mL of water and 16.12 g of sodium hydroxide (99+% purity, from Aldrich, MW=40). After it completely dissolved, 175.28 g of the di-dodecanol phosphate ester made according to the procedure shown in Example 1 was added. The mixture was then mixed vigorously at 90° C. for one hour until the solution was completely transparent. The solution was named solution A-2.

Then, to another 0.5 gallon size glass bottle, 1000 mL water and 99.15 g of aluminum potassium sulfate dodecahydrate (99+% purity, from Aldrich, MW=674.39) was added. The mixture was then mixed vigorously at 90° C. for one hour until the solution was completely transparent. This solution was named solution B-2.

Finally, under vigorous stirring, solution B-2 was mixed into solution A-2 at a speed of about 10 mL/sec to yield a white solid material. This material was then washed with pure water eight times, dried at vacuum at 65° C., and then further dried at 110° C. overnight. The final product was a white powder.

The product of Example 2 was believed to correspond to Formula II, where $R_1$ and $R_2$ are a $-C_{12}H_{25}$ group, and M is Al.

Example 3

To a 0.5 gallon size glass bottle was added 1000 mL water and 10.06 g of sodium hydroxide (99+% purity from Aldrich). After the sodium hydroxide completely dissolved, 105.3 g of di-dodecanol phosphate ester made according to the procedure shown in Example 1 was added. The mixture was then mixed vigorously at 90° C. for one hour until the solution was completely transparent. This solution was named solution A-3.

To another 0.5 gallon-size glass bottle was added 1000 mL water and 20.40 g of iron chloride (97% purity, from Aldrich). The mixture was then mixed vigorously at 23° C. for 0.5 hour until the solution was completely dissolved. This solution was named solution B-3. Finally, under vigorous stirring, solution B-3 was slowly added into the solution A-3 at a speed of about 10 mL/sec to yield a brown solid material. This material was then washed with pure water eight times, dried at vacuum at 65° C., and then further dried at 110° C. overnight. The final product was a brown powder.

The product of Example 2 was believed to correspond to Formula II, where $R_1$ and $R_2$ are a $-C_{12}H_{25}$ group, and M is Fe.

Examples 4 and 5

Into a 20 mL bottle was added 0.3 g of the product from Example 2 and 10 g of toluene. The mixture was then mixed vigorously at 90° C. for one hour until the solid was completely dissolved. After cooling down to 23° C., the mixture formed a gel material, indicating that the product made from the procedure disclosed in Example 2 was a very good gelator to oils. Upon vigorously shaking the bottle, the gel material was transformed to a thick fluid. This phenomenon indicated that the gel displayed shear thinning characteristics.

The same test was performed with the product from Example 3 with the same observed results.

Examples A-F

In Examples A-F Examples 2 and 3 disclosed above were employed in rubber compositions. A control rubber composition, Example A, was prepared according to the formulation shown in Tables 1 and 2. Five test compositions (Examples B-F) were also prepared by using the synthesized material of Examples 1 and 2 to replace part of the aromatic oil in the compound formulation of Tables 1 and 2. In each example, a blend of the ingredients was kneaded by the method listed in Table 3. The final stock was sheeted and molded at 165° C. for 15 minutes.

TABLE 1

| Composition for Master Batch | (Parts per hundred rubber) |
|---|---|
| SBR [1] | 100.00 |
| Precipitated silica filler [2] | 70.00 |
| Aromatic Oil [3] | 30.00 |
| Wax [4] | 1.50 |
| Stearic Acid [5] | 2.00 |
| Santoflex 13 (antioxidants) [6] | 0.95 |
| Si 69 (Silane Coupling Agent) [7] | 8.00 |

TABLE 2

| Additions to Composition for Final Batch | |
|---|---|
| Sulfur | 1.70 |
| N-(cyclohexylthio) phthalimide (retarder) | 0.25 |
| Zinc Oxide | 2.50 |
| Cyclohexyl-benzothiazole sulfonamide (accelerator) | 1.50 |
| Diphenylguanidine (accelerator) | 0.50 |

TABLE 3

Mixing Conditions

| Mixer: 300 g Brabender Master Batch Stage | Agitation Speed: 60 rpm |
|---|---|
| Initial Temperature | 110° C. |
| 0 min | charging polymers |
| 0.5 min | charging oil and filler |
| 5.0 min | drop |
| Remill Stage | |
| Initial Temperature | 110° C. |
| 0 min | charging stock, wax, stearic acid, antioxidant, silane, and metal phosphate esters |
| 5.0 min | drop |
| Final Batch Stage | |
| Initial Temperature | 75° C. |
| 0 sec | charging master stock |
| 30 sec | charging curing agents and accelerators |
| 75 sec | drop |

1. 23.5% styrene, solution polymerized, Mooney viscosity at 100° C. = 55 Mooney units, 11% vinyl content; available from Firestone Synthetic (Akron, OH)
2. Purchased from PPG (Pittsburgh, PA) as hydrate amorphous silica, trade name Hi Sil 190G
3. Purchased from Mobil (Fairfax, VA) under the trade name Mobilsol 90
4. Purchased from Aston Wax Corp. (Tilusville, PA)
5. Purchased from Sherex Chemical (Dublin, OH)
6. Chemical name: N-(1,3-dimethylbutyl)-N'-phenyl-p-phenylene-diamine; purchased from Monsanto (St. Louis, MO) under the trade name 6PPD
7. Chemical name: bis-(3-triethoxy-silyl propyl) tetrasulfide; purchased from Degussa (Parsippany, NJ)

Of the resulting vulcanized rubber compositions, measurement of the tensile strength, tear strength, and hysteresis loss gave the results as shown in Table 4. The tensile mechanical properties were measured using the standard procedure described in the ASTM-D 412 at 22° C. Test specimen were in the geometry of rings with a width of 0.05 inches, and a dimension of 0.075 inches in thickness. A specific gauge length of 1.0 inches was used for the tensile test. The dynamic properties were evaluated with an Oscillatory Shear Dynamic Analyzer—ARIS, and the test specimen geometry was in the form of a strip of 30 mm in length, 1.99 mm in thickness, and a width of 15 mm The following testing conditions were employed: frequency of 5 Hz and a strain of 2%.

TABLE 4

| | | A | B | C | D | E | F |
|---|---|---|---|---|---|---|---|
| SBR | | 100 | 100 | 100 | 100 | 100 | 100 |
| Silica filler | | 70 | 70 | 70 | 70 | 70 | 70 |
| Aromatic Oil | | 30 | 15 | 23 | 10 | 0 | 0 |
| Example 2 | | 0 | 15 | 7 | 20 | 23 | 15 |
| Example 3 | | 0 | 0 | 0 | 0 | 7 | 15 |
| MOONEY (130° C.) | $ML_{1+4}$ (MU): | 43.9 | 56.7 | 52.9 | 58.9 | 52 | 60 |
| Ring-Tensile (100° C.)[1] | E50 | 0.81 | 0.53 | 0.62 | 0.57 | 0.8 | 0.8 |
| | E300 | 5.79 | 3.6 | 4.64 | 3.37 | 5.92 | 5.85 |
| | $Tb^3$ (Mpa) | 8.12 | 8.8 | 8.01 | 8.66 | 8.54 | 8.49 |
| | $Eb^4$ (%) | 385.8 | 570.7 | 431 | 567.7 | 386.1 | 386.3 |
| Ring-Tensile (23° C.) | E50 | 1.03 | 0.83 | 0.86 | 0.89 | 0.98 | 1.04 |
| | E300 | 6.61 | 3.97 | 5.25 | 3.77 | 6.34 | 6.62 |
| | Tb (MPa) | 16.85 | 17.01 | 17.3 | 16.78 | 18.11 | 18.55 |
| | Eb (%) | 568.95 | 754.6 | 642 | 764.3 | 585.6 | 593.1 |
| Hardness (100° C.) | Shore A Mean | 58.86 | 50.72 | 52.16 | 53.08 | 59.7 | 59.14 |
| Hardness (23° C.) | Shore A Mean | 63.34 | 57.54 | 57.58 | 60.72 | 64.4 | 65.22 |
| Temperature Sweep[2] 2%, 5 Hz | $G'^5$ (MPa) @ 0° C. | 16.21 | 13.14 | 10.51 | 15.58 | 13.00 | 15.56 |
| | $G''^6$ (MPa) @ 0° C. | 2.92 | 2.11 | 1.82 | 2.57 | 2.06 | 2.29 |
| | tan δ @ 0° C. | 0.180 | 0.160 | 0.174 | 0.165 | 0.158 | 0.147 |
| | G' (MPa) @ 60° C. | 7.15 | 4.75 | 4.53 | 4.90 | 6.35 | 6.70 |
| | G'' (MPa) @ 60° C. | 1.04 | 0.760 | 0.720 | 0.817 | 0.867 | 0.904 |
| | tan δ @ 60° C. | 0.146 | 0.159 | 0.160 | 0.166 | 0.136 | 0.135 |
| | Peak tan δ | 0.680 | 0.728 | 0.794 | 0.667 | 0.757 | 0.658 |
| | Tg (C.°) | −39.72 | −41.26 | −39.51 | −42.39 | −40.08 | −40.84 |
| Wet Traction | Stanley London | 56.8 | 60.8 | 59.4 | 60 | 60 | 59.4 |

[1] Ring-Tensile measurements indicate the tensile strength.
[2] Temperature Sweep Data indicates rolling resistance.
[3] Tb means strength at break.
[4] Eb means elongation at break.
[5] G' is the storage modulus.
[6] G'' is the loss modulus.

As can be seen in Tables 4 and 5, the test compositions exhibited well-balanced physical properties. In particular, the test compounds indicate improved wet traction, and maintained the same level or better rolling resistance.

An improvement in the wet traction is preferably, but not limited to, at least a 1% increase in Stanley London value as compared to the same rubber composition without the metal phosphate ester or with the metal phosphate ester replacing an equivalent part of the aromatic oil. Furthermore, the same level or better rolling resistance is preferably, as indicated by the tan δ at 60° C., a lower value or the same value.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

It is claimed:

1. A composition comprising:
   a diene rubber,
   a metal phosphate ester of the formula

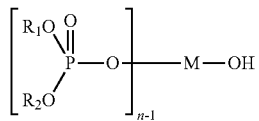

wherein M is a metal with an oxidation state of +3 or +4, $R_1$ and $R_2$ are independently selected from any organic moiety or hydrogen, except $R_1$ and $R_2$ cannot both be hydrogen, and n is the oxidation state of M.

2. The composition of claim 1, wherein n−1 is 2.

3. The composition of claim 1, wherein $R_1$ is an alkyl chain with six to fifty carbon atoms, and $R_2$ is an alkyl chain with six to fifty carbon atoms.

4. The composition of claim 1, wherein the metal phosphate ester is not soluble in water.

5. The composition of claim 1, wherein the diene rubber is sulfur-curable and selected from the group consisting of styrene-butadiene rubber, natural rubber, butadiene rubber, polyisoprene rubber, poly(styrene-isoprene), or styrene-isoprene-butadiene terpolymer and combinations thereof.

6. The composition of claim 1, wherein the metal phosphate ester is present in the composition in an amount ranging from about 5 phr to about 100 phr.

7. The composition of claim 1, wherein the metal phosphate ester is a phosphate ester of aluminum or iron and an alcohol.

8. The composition of claim 7, wherein the metal phosphate ester is selected from the group consisting of bis(dilaurylphosphato)iron(III)hydroxide or bis(dilaurylphosphato)aluminum(III)hydroxide.

9. The composition of claim 1, further comprising a silica filler.

10. The composition of claim 9, wherein the silica is present in an amount of about 50 to about 100 phr.

11. The composition of claim 1, wherein the metal phosphate ester displays shear thinning characteristics when mixed in toluene.

12. The composition of claim 1, wherein at least one of $R_1$ and $R_2$ comprises an alkyl chain with at least one unit of unsaturation.

13. The composition of claim 1, wherein at least one of $R_1$ or $R_2$ comprises an alkyl chain with one or more sulfur-curable double bonds.

14. The composition of claim 13, wherein the double bond is between two non-terminal carbons in the alkyl chain.

15. The composition of claim 1, wherein $R_1$, $R_2$, or both $R_1$ and $R_2$ contain a metal phosphate ester.

16. A method of making a rubber composition comprising:
   combining a solvent and a phosphate ester to form a first solution;
   adding a source of metal ions to the first solution and mixing to form a metal phosphate ester, the metal being selected from the metals having an oxidation state of +3 or +4;
   mixing the metal phosphate ester with a diene rubber.

17. The method of claim 16, wherein the step of adding a source of metal ions to the first solution comprises dissolving the source of metal ions in a solvent to form a second solution, and combining the second solution with the first solution.

18. The method of claim 16, wherein the molar ratio of metal ions to the phosphate ester is about 1:10 to about 1:1.

19. The method of claim 16, wherein the source of metal ions is aluminum potassium sulfate.

20. The method of claim 16, wherein the pH of the first solution, prior to adding the source of metal ions, is basic.

21. The method of claim 16, wherein the phosphate ester includes one or more alkyl chains with one or more sulfur-curable double bonds.

22. The method of claim 16, wherein the metal phosphate ester is added to the diene rubber in a remill stage.

23. A rubber composition produced as a product of the method of claim 16.

24. The method of claim 16, further comprising forming the composition into a tire tread.

25. A tire tread comprising:
   a diene rubber,
   a metal phosphate ester of the formula

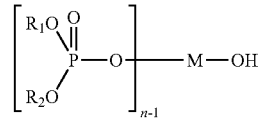

wherein M is a Group III or transition metal excluding zinc, copper, and nickel, R is any independently selected organic moiety, and n is the oxidation state of M.

26. The tire tread of claim 25, wherein the metal is selected from the group consisting of aluminum, iron, and titanium.

* * * * *